US009637639B2

(12) United States Patent
Greenwood et al.

(10) Patent No.: US 9,637,639 B2
(45) Date of Patent: May 2, 2017

(54) AQUEOUS SILICA DISPERSION

(75) Inventors: Peter Harry Johan Greenwood, Göteborg (SE); Hans Lagnemo, Göteborg (SE)

(73) Assignee: AKZO NOBEL CHEMICALS INTERNATIONAL B.V., Amersfoort (NL)

( * ) Notice: Subject to any disclaimer, the term of this patent is extended or adjusted under 35 U.S.C. 154(b) by 11 days.

(21) Appl. No.: 13/505,655

(22) PCT Filed: Nov. 1, 2010

(86) PCT No.: PCT/EP2010/066551
§ 371 (c)(1),
(2), (4) Date: May 2, 2012

(87) PCT Pub. No.: WO2011/054774
PCT Pub. Date: May 12, 2011

(65) Prior Publication Data
US 2012/0234206 A1 Sep. 20, 2012

Related U.S. Application Data

(60) Provisional application No. 61/258,699, filed on Nov. 6, 2009.

(30) Foreign Application Priority Data

Nov. 5, 2009 (EP) .................................... 09175128

(51) Int. Cl.
| | |
|---|---|
| C09D 5/00 | (2006.01) |
| C08L 83/04 | (2006.01) |
| C08L 63/00 | (2006.01) |
| C08L 75/04 | (2006.01) |
| C08L 67/02 | (2006.01) |
| C09C 1/30 | (2006.01) |
| B01F 17/00 | (2006.01) |
| C01B 33/145 | (2006.01) |
| C09D 7/12 | (2006.01) |
| C09D 7/14 | (2006.01) |
| C08K 3/36 | (2006.01) |
| C08K 9/06 | (2006.01) |

(52) U.S. Cl.
CPC ........ *C09C 1/3081* (2013.01); *B01F 17/0007* (2013.01); *C01B 33/145* (2013.01); *C09C 1/309* (2013.01); *C09C 1/3063* (2013.01); *C09C 1/3072* (2013.01); *C09D 7/1225* (2013.01); *C09D 7/14* (2013.01); *C01P 2006/22* (2013.01); *C08K 3/36* (2013.01); *C08K 9/06* (2013.01)

(58) Field of Classification Search
CPC . B01F 17/0007; C01B 33/145; C09D 7/1225; C09D 7/14; C09C 1/3063; C09C 1/3072; C09C 1/3081; C09C 1/309; C01P 2006/22; C08K 3/36; C08K 9/06

USPC .................................................... 106/287.26
See application file for complete search history.

(56) References Cited

U.S. PATENT DOCUMENTS

| | | | |
|---|---|---|---|
| 2,630,410 A | 3/1953 | Clapsadle et al. | |
| 3,699,049 A | 10/1972 | Pluta et al. | |
| 4,269,945 A | 5/1981 | Vanderhider et al. | |
| 4,927,749 A | 5/1990 | Dorn | |
| 5,368,833 A | 11/1994 | Johansson et al. | |
| 5,840,781 A | 11/1998 | Dietrich et al. | |
| 5,928,790 A | 7/1999 | Bokisa | |
| 2004/0034203 A1* | 2/2004 | Brook ............. | A61K 47/48961 530/402 |
| 2004/0147029 A1 | 7/2004 | Adam | |
| 2009/0286070 A1* | 11/2009 | Sueyoshi et al. ............. | 428/336 |
| 2010/0130642 A1* | 5/2010 | Stanjek .............. | C08G 18/3895 523/212 |
| 2012/0142845 A1* | 6/2012 | De Winter ........... | C09C 1/3684 524/525 |

FOREIGN PATENT DOCUMENTS

| | | |
|---|---|---|
| EP | 1 236 765 A1 | 9/2002 |
| EP | 1 554 221 B1 | 7/2005 |
| WO | WO 2004/035474 A1 | 4/2004 |
| WO | WO 2006/128793 A1 | 12/2006 |
| WO | WO 2008/145585 A1 | 12/2008 |

OTHER PUBLICATIONS

International Search Report and Written Opinion for International Application No. PCT/EP2010/066551, date of mailing Jan. 11, 2011.
Iler, Ralph K., "The Chemistry of Silica", John Wiley & Sons (1979) pp. 407-409.
Iler et al., "Degree of Hydration of Particles of Colloidal Silica in Aqueous Solution", Phys. Chem. 50 (1956) pp. 955-957.
Rao, A., Kulkarni, M. Amalnerkar, D.P., Seth, T.; "Surface Chemical Modification of Silica Aerogels Using Various Alkyl-alkoxy/ chloro Silanes"; Applied Surface Science, Nov. 7, 2002; pp. 262-270; vol. 206; Maharashtra, India.

* cited by examiner

*Primary Examiner* — Jun Li
(74) *Attorney, Agent, or Firm* — Norris McLaughlin & Marcus P.A.

(57) ABSTRACT

The present invention relates to a method of producing a dispersion comprising a) mixing an aqueous dispersion of silanized colloidal silica particles with at least one organic compound containing at least two hydroxyl groups to provide an aqueous dispersion of silanized colloidal silica particles and said at least one organic compound, wherein the mixing is performed in the substantial absence of any monofunctional alcohol b) withdrawing water from the formed aqueous dispersion until the remainder of water in the dispersion is below about 10 wt %. The invention also relates to a dispersion obtainable therefrom and the use of the dispersion.

16 Claims, No Drawings

AQUEOUS SILICA DISPERSION

This application is a national stage filing under 35 U.S.C. §371 of PCT/EP2010/066551, filed Nov. 1, 2010, which claims priority to European Patent Application No. 09175128.9, filed Nov. 5, 2009, and U.S. Provisional Patent Application No. 61/258,699, filed on Nov. 6, 2009, the contents of which are incorporated herein by reference in their entirety.

The present invention relates to a dispersion comprising silanised colloidal silica particles and at least one organic compound containing at least two hydroxyl groups, a method of producing such dispersion, and the use thereof for provision of a polymeric material. The invention also relates to a method for production of a polymeric material. The dispersion can also be used in lacquer or coating applications.

BACKGROUND OF THE INVENTION

Silica sols have found wide utility in many fields including filling, extending, thickening and reinforcing various organic materials such as plastics, resins, rubber, oils, etc.

WO2006/128793 discloses a method for making polymeric materials containing silica particles in the form of powders or pastes, which method comprises the steps of:
1) diluting an alkali stabilized silica sol with water and/or a water-soluble organic solvent;
2) pumping a silane and/or an organic compound, selected from polyols and dicarboxylic acids into the agitated sol of step 1;
3) deionising the sol of step 2 by contacting it with anion and cation exchange resins; and
4) drying the deionised sol of step 3 by evaporating the water.

US2004/0147029 relates to a silicon dioxide dispersion that comprises an outer flowable phase containing polymerisable monomers, oligomers and/or pre-polymers that can be converted to polymers by non-radical reaction; and/or polymers, and a disperse phase containing amorphous silicon dioxide.

It would be desirable to provide a stable colloidal silica dispersion which remains stable during storage and transport, in particular in the absence of a separate stabilizing agent, and that can be used for example in applications involving filling, extending, thickening and/or reinforcing various organic materials, for example plastics, resins, or rubber.

The Invention

The invention relates to a method of producing a dispersion comprising
a) mixing an aqueous dispersion of silanised colloidal silica particles with at least one organic compound containing at least two hydroxyl groups to provide an aqueous dispersion of silanised colloidal silica particles and said at least one organic compound, wherein the mixing is performed in the substantial absence of any monofunctional alcohol; and
b) withdrawing water from the aqueous dispersion until the remainder of water in the dispersion is below about 10 wt %.

The withdrawal of water can be made by any conventional operation unit, for example an evaporator.

The term "monofunctional alcohol" is an alcohol containing only one hydroxyl group per molecule, for example methanol or ethanol.

By "substantially free" or in the "substantial absence" of monofunctional alcohol is meant that the content of monofunctional alcohol in the dispersion is less than 10 wt %, more specifically less than 5 wt %, and in particular less than 1 wt %.

As a consequence thereof, the colloidal silica particles are substantially unmodified with respect to monofunctional alcohol. According to one embodiment, less than 10, less than 5, less than 1 or less than 0.1%, or even less than 0.05 wt % of the silica particles are modified by a monofunctional alcohol.

According to one embodiment, the colloidal silica particles may be modified and can contain other elements such as aluminium, nitrogen, zirconium, gallium, titanium and/or boron, which can be present in the particles and/or the continuous phase. Boron-modified silica sols are described in e.g. U.S. Pat. No. 2,630,410. The procedure of preparing an aluminium modified silica sol is further described in e.g. "The Chemistry of Silica", by Iler, K. Ralph, pages 407-409, John Wiley & Sons (1979) and in U.S. Pat. No. 5,368,833.

The colloidal silica particles may have a specific surface area from about 20 to about 1500, specifically from about 50 to about 900, and more specifically from about 70 to about 600, or from about 120 to about 600 $m^2/g$, for example from about 150 to about 450 $m^2/g$.

The colloidal silica particles may have an average particle diameter ranging from about 2 to about 150 nm, for example from about 3 to about 60 such as from about 5 to about 40 or from about 5 to about 25 nm, such as from about 6 to about 18 nm.

The colloidal silica particles may have a narrow particle size distribution, i.e. a low relative standard deviation of the particle size. The relative standard deviation of the particle size distribution is the ratio of the standard deviation of the particle size distribution to the mean particle size by numbers. The relative standard deviation of the particle size distribution may be lower than about 60% by numbers, specifically lower than about 30% by numbers, and more specifically lower than about 15% by numbers.

The colloidal silica particles may be dispersed in an aqueous medium, specifically in the presence of stabilising cations such as $K^+$, $Na^+$, $Li^+$, $NH_4^+$, organic cations, primary, secondary, tertiary, and quaternary amines, or mixtures thereof so as to form an aqueous silica sol. However, also dispersions comprising organic mediums, e.g. acetone may be used, specifically in an amount up to about 20, for example in an amount from about 1 to about 20, specifically from about 1 to about 10, and more specifically from about 1 to about 5 volume percent of the total medium volume. However, in one specific embodiment aqueous silica sols without any further mediums are used. The colloidal silica particles may be negatively charged. The silica content in the silica sol may be from about 10 to about 80, specifically from about 20 to about 70, and more specifically from about 20 to about 60, or from about 25 to about 60, or from about 30 to about 60 wt %. The higher the silica content, the more concentrated the resulting silanised colloidal silica dispersion. The pH of the silica sol may be from about 1 to about 13, specifically from about 6 to about 12, and more specifically from about 7.5 to about 11. However, for aluminium-modified silica sols, the pH may be from about 1 to about 12, specifically from about 3.5 to about 11.

The silica sol may have an S-value from about 20 to about 100, specifically from about 30 to about 90, and more specifically from about 60 to about 90.

It has been found that dispersions with an S-value within these ranges can improve the stability of the resulting dispersion. The S-value characterises the extent of aggregation of colloidal silica particles, i.e. the degree of aggregate or microgel formation. The S-value has been measured and calculated according to the formulas given in J. Phys. Chem. 60(1956), 955-957 by Iler, R. K. & Dalton, R. L.

The S-value depends on the silica content, the viscosity, and the density of the colloidal silica particles. A high S-value indicates low microgel content. The S-value represents the amount of $SiO_2$ in percent by weight present in the dispersed phase of e.g. a silica sol. The degree of microgel can be controlled during the production process as further described in e.g. U.S. Pat. No. 5,368,833.

The colloidal silica particles, also referred to as silica sols herein, may be derived from e.g. precipitated silica, micro silica (silica fume), pyrogenic silica (fumed silica) or silica gels with sufficient purity, and mixtures thereof; they may be silanised by way of the method described in WO2004/035474. The silica sol may also, typically, be obtained from waterglass as disclosed in e.g. U.S. Pat. No. 5,368,833.

The colloidal silica particles can be modified with any suitable silane compound. For example, tris-(trimethoxy) silane, octyl triethoxysilane, methyl triethoxysilane, methyl trimethoxysilane; bis-(3-[triethoxysilyl]propyl)polysulfide, beta-(3,4-epoxycyclohexyl)-ethyl trimethoxysilane, gamma-methacryloxypropyl trimethoxysilane, gamma-methacryloxypropyl triisopropoxysilane, gamma-methacryloxypropyl triethoxysilane, octyltrimethyloxy silane, ethyltrimethoxy silane, propyltriethoxy silane, phenyltrimethoxy silane, cyclohexyltrimethoxy silane, cyclohexyltriethoxy silane, dimethyldimethyoxy silane, 3-chloropropyltriethoxy silane, 3-methacryloxypropyltrimethoxy silane, i-butyltriethoxy silane, trimethylethoxy silane, phenyldimethylethoxy silane; silanes containing an epoxy group (epoxy silane), glycidoxy and/or a glycidoxypropyl group such as gamma-glycidoxypropyl trimethoxysilane, gamma-glycidoxypropyl methyldiethoxysilane, (3-glycidoxypropyl)triethoxy silane, (3-glycidoxypropyl) hexyltrimethoxy silane, beta-(3,4-epoxycyclohexyl)-ethyltriethoxysilane; silanes containing a vinyl group such as vinyl triethoxysilane, vinyl trimethoxysilane, vinyl tris-(2-methoxyethoxy)silane, vinyl methyldimethoxysilane, vinyl triisopropoxysilane; hexamethyldisiloxane, trimethylsilyl chloride, vinyltriethoxy silane, hexamethyldisilizane, and mixtures thereof. According to one embodiment, silane compounds with mercapto functionality may be used, for example 3-mercaptopropyltrimethoxysilane, 3-mercaptopropyltriethoxy silane, $HS(CH_2)_3\text{—}Si(OCH_3)_3$, mercaptosilane possessing at least one hydroxyalkoxysilyl group and/or a cyclic dialkoxysilyl group, gamma-mercaptopropyl trimethoxysilane, gamma-mercaptopropyl triethoxysilane, gamma-mercaptopropyl trimethoxysilane.

According to one embodiment, silane compounds with amido-functionality, for example (meth)acryl amide groups; ureido-functionality, amino-functionality, ester functionality and/or isocyanato functionality such as tris-[3-(trimethoxysilyl)propyl]isocyanurate may be used. Suitable ureido functional silanes include β-ureidoethyl-trimethoxysilane, β-ureidoethyl-triethoxysilane, γ-ureidoethyltrimethoxysilane, and/or γ-ureidopropyl-triethoxysilane. Silane compounds with ureido functionality may have the structure $B_{(4-n)}\text{—}Si\text{—}(A\text{-}N(H)\text{—}C(O)\text{—}NH_2)_n$, wherein A is an alkylene group containing from 1 to about 8 carbon atoms, B is a hydroxyl or alkoxy group containing from 1 to about 8 carbon atoms, and n is an integer from 1 to 3 provided that if n is 1 or 2, each B may be the same or different.

According to one embodiment, silane with amino-functionality can be for example aminomethyltriethoxysilane, N-(β-aminoethyl)aminomethyltrimethoxysilane, aminomethylmethyl diethoxysilane, N-(β-aminoethyl)methyltriethoxysilane, γ-aminopropyltriethoxysilane, γ-aminopropylmethyldiethoxysilane, γ-aminoisobutyltrimethoxysilane, N-(β-aminoethyl)-γ-aminopropyltrimethoxysilane, and N-(β-aminoethyl)-γ-aminopropylmethyldimethoxysilane. Further examples of the above silane functionalities which may be used include those mentioned in U.S. Pat. No. 5,928,790 and U.S. Pat. No. 4,927,749, hereby incorporated by reference.

In order to prepare the silanised colloidal silica particles, silane compounds and colloidal silica particles can be mixed continuously, for example in an aqueous phase, for example at a temperature from about 20 to about 95, such as from about 50 to about 75, or from about 60 to about 70° C. Silane is for example slowly added to the silica particles under vigorous agitation at a temperature above about 60° C. and at a controlled rate, which suitably is from about 0.01 to about 100, such as from about 0.1 to about 10, from about 0.5 to about 5, or from about 1 to about 2 silane molecules per $nm^2$ colloidal silica surface area (on the colloidal silica particles) and hour. The addition of silane can be continued for any suitable time depending on the addition rate, amount of silane to be added, and degree of desired silylation. However, the addition of silane can be continued up to about 5 hours, or up to about 2 hours until a suitable amount of silane compounds has been added. According to one embodiment, from about 0.1 to about 6, such as from about 0.3 to about 3, or from about 1 to about 2 silane molecules per $nm^2$ surface area of the colloidal silica particles is added. Continuous addition of silane to the colloidal particles may be particularly important when preparing highly concentrated silanised silica dispersions having a silica content up to about 80 wt %.

According to one embodiment, silane can be diluted before mixing it with the colloidal silica particles, e.g. with water to form a premix of silane and water, suitably in a weight ratio of from about 1:8 to about 8:1, from about 3:1 to about 1:3, or from about 1.5:1 to about 1:1.5. The resulting silane-water solution is substantially clear and stable and easy to mix with the colloidal silica particles.

According to one embodiment, the weight ratio of silane to silica in the dispersion may be from about 0.01 to about 1.5, specifically from about 0.05 to about 1, and more specifically from about 0.1 to about 1 or from about 0.15 to about 1 or from about 0.2 to about 0.5.

Further suitable embodiments of silane, colloidal silica and preparation of silanised silica are disclosed in EP 1554221 B1.

According to one embodiment, the organic compound containing at least two hydroxyl groups is a polyol.

According to one embodiment, no further organic compound than said polyol is mixed with the silica. According to one embodiment, no or substantially no aldehyde or ketone is added.

By "polyol" is meant an organic compound containing at least two hydroxyl groups, which compound is at least partially miscible with or soluble in water, for example a diol, triol and tetrol containing 2, 3 and 4 hydroxyl groups respectively. By "glycol" is specifically meant an organic substance containing two hydroxyl groups. Polyols may be divided into two classes; those having a molecular weight range of 62-1000 and a functionality 3-8, which may be used for making rigid foams, rigid solids and stiff coatings and those having a molecular weight range of 1000-6500 and a functionality 2-3, which may be used for making flexible foams and elastomers. The rigidity/flexibility properties can be adjusted by mixing polyols of said two classes as appropriate. The polyols used according to the present invention may for instance be of polyether type, polyester type, or acrylic type.

According to one embodiment, said at least one organic compound comprising at least two hydroxyl groups, typically a polyol, has a molecular weight ranging from about 62 to about 10 000 g/mole, specifically from about 62 up to about 4000 g/mole.

According to one embodiment, the molecular weight of the organic compound ranges from about 62 to about 500, for example from about 62 to about 400 or from about 62 to about 200 g/mole. According to one embodiment, the molecular weight of the organic compound ranges from about 200 to about 400.

According to one embodiment, the polyol is selected from polyethylene glycol, glycerol, trifunctional polyether polyol, sucrose-based polyether polyol, or mixtures thereof.

Polyether polyols may be chosen among: polytetramethylene glycol polyols (PTMEG), which are prepared by acid-catalyzed polymerization of tetrahydrofurane (THF); polypropylene glycol polyols, which can be based on propylene oxide only, a mixture of ethylene oxide and propylene oxide or a mixture of propylene oxide, ethylene oxide and double metal cyanide catalysts (DMC); polymer modified polyols; and amine terminated polyether polyols.

Polyester polyols may be chosen among: polybutanediol adipates; polycaprolactone polyols; and polyethylene terephthalate polyols. Polyester polyols can be linear or branched and the branching can be weak, moderate or extensive. Polyester polyols can be modified by incorporating saturated, fatty acids of low molecular weight into their structure.

Acrylic polyols are prepared by polymerisation of hydroxyl-containing monomers such as hydroxyethyl methacrylate, hydroxypropyl methacrylate and allyl alcohol propoxylate and copolymers such as methyl methacrylate, styrene, butyl acrylate, 2-ethylhexyl acrylate, acrylic acid, methacrylic acid and acrylonitrile.

Polyester and polyether polyols are characterized by their hydroxyl functionality, which is related to the average number of hydroxyl groups per polyol molecule and usually falls in the range from about 2 to almost 4. Acrylic polyols have functionalities ranging from 2 to 8. Polyols of diol type, which may be used to prepare e.g. ester-based thermoelastomers, are acyclic and alicyclic dihydroxy compounds. Exemplary diols are such ones with 2-15 carbon atoms such as ethylene, propylene, tetramethylene, pentamethylene, 2,2'-dimethyl-trimethylene, hexemethylene, and decamethyleneglycols, dihydroxy cyclohexane, cyclohexane dimethanol, etc. A specific group of aliphatic diols are such ones containing 2-8 carbon atoms. Equivalent ester-forming derivatives of diols are also useful, e.g. ethylene oxide or ethylene carbonate can be used in place of ethylene glycol. Castor oil polyols, polycarbonate polyols and polybutadiene polyols may also be used. Further suitable polyols are disclosed in inter alia U.S. Pat. No. 5,840,781, US 2004/0147029, and U.S. Pat. No. 4,269,945, and WO2006/128793.

According to one embodiment, the polyol is substantially water miscible.

According to one embodiment, the weight ratio of silica to organic compound, for example polyol, ranges from about 1:20 to about 4:1, for example from about 1:10 to about 2:1, or from about 1:5 to about 1:1, or from about 2:5 to about 2:3.

The temperature during evaporation suitably ranges from about 10 to about 200° C., for example from about 80 to about 200° C. The pressure during evaporation suitably ranges from about 20 to about 50 mbar. The duration of evaporation suitably is from about 1 to about 3 h or until the remaining water content is below 10 wt %, for example below about 5 wt % or below about 3 wt % or below about 1 wt %.

The invention also relates to a dispersion comprising silanised colloidal silica particles and at least one organic compound containing at least two hydroxyl groups, wherein the dispersion is substantially free from any monofunctional alcohol.

The present invention also relates to a stable dispersion obtainable by the method. The colloidal silica particles and organic compound may have any characteristics as defined in the method portion of this application.

According to one embodiment, in particular after the substantial withdrawal of water, the weight ratio of silica to said organic compound in the dispersion ranges from about 1:20 to about 4:1, for example from about 1:10 to about 2:1, or from about 1:5 to about 1:1, or from about 2:5 to about 2:3.

According to one embodiment, the water content of the dispersion is below about 10 wt %, for example below about 5 wt %, such as below about 1 wt %.

According to one embodiment, the dispersion contains less than 10 wt % such as less than 5 wt % or less than 1 wt % of monofunctional alcohol.

According to one embodiment, the dispersion is stable. By the term "stable dispersion" is meant a dispersion that does not substantially gel or precipitate within a period of at least about 2 months, specifically at least about 4 months, and more specifically at least about 5 months at normal storage in room temperature, i.e. at a temperature from about 15 to about 35° C.

According to one embodiment, the viscosity of the dispersion is increased less than 10 times, such as less than 5, or less than 2 times over a period of 2 months.

The stability of the dispersion facilitates the handling and application thereof in any use since it allows for storage and need not be prepared on site immediately before usage. The already prepared dispersion can thus easily be directly used. The dispersion is also beneficial in the sense that it does not involve hazardous amounts of toxic components.

The dispersion may contain besides silanised colloidal silica particles, at least to some extent, non-silanised colloidal silica particles depending on the size of the silica particles, weight ratio of silane to silica, type of silane compound, reaction conditions etc. In one embodiment at least about 40 wt % of the colloidal silica particles are silanised (silane-modified), specifically at least about 65 wt %, specifically at least about 90 wt %, and more specifically at least about 99 wt %. The dispersion prepared may comprise besides silane in the form of silane groups or silane derivatives bound or linked to the surface of the silica particles also at least to some extent freely dispersed unbound silane compounds. In one embodiment at least about 40%, specifically at least about 60%, more specifically at least about 75%, more particularly at least about 90%, and even more particularly at least about 95 wt % of the silane compounds are bound or linked to the surface of the silica particles.

At least about 1% by number of the silanol surface groups on the colloidal silica particles may be capable of binding or linking to silane groups on the silane compounds, specifically at least about 5%, specifically at least about 10%, more specifically at least about 30%, in particular at least about 50% bind or link to a silane group.

According to one embodiment, the dispersion substantially consists of said silanised colloidal silica particles and said organic compound comprising at least two hydroxyl groups. These silanised colloidal silica and organic compounds may be as described in the method of providing the dispersion herein. However, the dispersion comprising said silica particles and organic compounds may also comprise further components.

According to one embodiment, the obtained dispersion is substantially free from any aldehyde or ketone. According to one embodiment, the aldehyde and/or ketone content is less than about 5 wt % or less than about 1 wt % based on the total weight of the dispersion.

According to one embodiment, the silica content in the obtained dispersion ranges from about 10 to about 80, specifically from about 15 to about 70, for example from about 20 to about 70, and more specifically from about 25 to about 60 wt % or from about 30 to about 60 wt %, or from about 30 to about 50 wt %.

The present invention also relates to the use of the obtained dispersion as described herein for providing a solventborne lacquer or coating composition which is essentially free from any water content, for example less than 10 wt %, such as less than 5 wt % or less than 1 wt % water based on the total weight of the solvent borne lacquer or coating composition.

The present invention also relates to the use of the dispersion for condensation polymerization. According to one embodiment, the polymerization can be used to produce polyester, alkyds, polyamides, polyurethanes, phenolformaldehyde, ureaformaldehyde, epoxy polymers, silicon polymers.

The present invention also relates to a method for producing a polymeric material, comprising reacting
a) the dispersion comprising silanised colloidal silica and at least one organic compound containing at least two hydroxyl groups with
b) at least one component selected from an isocyanate, a dicarboxylic acid, an epoxide, a siloxane, or a diamine.
The isocyanate suitably is a monomer, oligomer, or polymer having two or more functional groups of isocyanate such as a diisocyanate or a diphenylmethane diisocyanate. The reaction is suitably performed in the presence of a catalyst.
The organic compound containing at least two hydroxyl groups may be converted to polymers by non-radical reactions; in particular by non-radical reactions involving isocyanates, polyisocyanates, dicarboxylic acids, diamines, or combinations thereof. Examples of suitable isocyanates, polyisocyanates, dicarboxylic acids, and diamines are disclosed in e.g. WO2006/128793.

The present invention results in a more homogeneous product due to the fact that the silica is substantially homogeneously dispersed and does not appear in any inhomogeneous form such as in a precipitated form. The obtained product has a more homogeneous matrix resulting in improved mechanical strength, durability etc.

According to one embodiment, the polymeric material produced is urethane-based polymers such as urethane-based thermoplastic elastomers and pure polyurethane polymers. The polymeric material may also be polyester including ester-based thermoplastic elastomers or alkyd which is a polyester modified by the addition of fatty acids. The polymeric material may also be a melamine, polyamide, including amide-based thermoplastic elastomers, and polyurea polymers containing urethane groups.

According to one embodiment, the polymeric material is polyurethane, polyester, epoxy resins, polysiloxane, or a polyamide or a mixture thereof.

According to yet another embodiment, the amount of silanised silica particles constitutes from about 1 to about 40, for example from about 2 to about 20, for example from about 2 to about 15 or for example from about 3 to about 10 wt % of the produced polymeric material (i.e. silanized silica content based on weight of polymeric material).

According to another embodiment, further components of the method can include inter alia chain extenders, branching agents, cross-linking agents, catalysts, foaming agents, and defoaming agents. Such components are disclosed inter alia in U.S. Pat. No. 5,840,781.

The present invention also relates to a polymeric material obtainable by the method as described herein.

The present invention also relates to the use of such polymeric material, for example polyurethane, polyester, epoxy resin, polysiloxane and/or polyamide for the production of flexible and rigid foams, fibers, coatings and cast elastomers.

The method of producing a polymer using a polyol-containing dispersion may be used for the production of various polymers, such as polyurethanes, urethane-based thermoelastomers, ester-based thermoelastomers, and amide-based thermoelastomers, the basic concepts of which are described in WO2006/128793.

The invention being thus described, it will be obvious that the same may be varied in many ways. Such variations are not to be regarded as a departure from the gist and scope of the present invention, and all such modifications as would be obvious to one skilled in the art are intended to be included within the scope of the claims. While the examples here below provide more specific details of the reactions, the following general principles may here be disclosed. The following examples will further illustrate how the described invention may be performed without limiting the scope of it.

All parts and percentages refer to part and percent by weight, if not otherwise stated.

EXAMPLES

The silica sols used in the examples are shown in Table 1 below:

TABLE 1

| Sol designation | Silica sol | Silica content (wt %) | Surface modification | pH | Supplier |
|---|---|---|---|---|---|
| A | Bindzil ® 30/360 | 29 | Silane | 6-8 | Eka Chemicals AB, Sweden |
| B | Bindzil ® 30/360 | 30 | None | 8-11 | Eka Chemicals AB, Sweden |
| C | Bindzil ® 820DI | 20 | None | 2-3 | Eka Chemicals AB, Sweden |
| D | Bindzil CC301 | 50 | Yes | 2 | Eka Chemicals AB, Sweden |
| E | Bindzil CC301 | 30 | Yes | 2 | Eka Chemicals AB, Sweden |

The polyols used in the examples are shown in Table 2 below:

TABLE 2

| Polyol | Brief description | Supplier |
|---|---|---|
| PEG 400 | Polyethylene Glycol - average molecular weight 400 | Akzo Nobel Surface Chemistry, Sweden |
| PEG 200 | Polyethylene Glycol - average molecular weight 200 | Fischer Scientific |
| Glycerine | Propane-1,2,3-triol | Fischer Scientific |
| Ethylene glycol | | |
| Diethylene glycol | | Dow (via August Hedinger GmbH) |
| Dipropylene glycol | | Dow (via August Hedinger GmbH) |
| Dowanol PM, | Propylene Glycol Methyl Ether | Dow (via August Hedinger GmbH) |
| Dowanol DPM, | Dipropylene Glycol Methyl Ether | Dow (via August Hedinger GmbH) |
| Dowanol TPM, | Tripropylene Glycol Methyl Ether | Dow (via August Hedinger GmbH) |
| Arcol 1108 | Trifunctional polyether polyol | Bayer MaterialScience AG, Leverkusen, Germany |
| Desmophen PU 21AP27 | Sucrose-based polyether polyol | Bayer MaterialScience AG, Leverkusen, Germany |

Dispersions of the silica sols in Table 1 were prepared according to the following general description, with amounts and values for each individual example according to Table 3 below. The respective silica sols were mixed with polyols according to the specifications. In some of the examples the pH of the silica sol was reduced by cation exchange to pH 2 before mixing to the value indicated.

The mixing continued for a period of about 1 minute, whereafter the mixture was subjected to evaporation at a reduced pressure of typically 20-30 mbar, at the temperature indicated, until no more water evaporated. The water content was as indicated in tables 4a and 4b based on the total weight of the evaporated mixture.

The viscosity of the thus evaporated mixtures was determined according to ASTM D1200 using a Ford Viscosity Cup #5 on the date of preparation (table 3), and after aging (table 5 which also contains some initial viscosity data for some of the samples). In table 5, two viscosity measurements were made for some samples after aging. The dates at which viscosity measurements were performed are in the format year-month-day in table 5. In tables 3 and 5, viscosity is measured in seconds using the Ford Viscosity Cup #5 test if not otherwise indicated. For some samples, the viscosity was given in mPas as measured by Brookfield viscometer.

TABLE 3

| No | Solvent | Solvent (g) | Silica sol | Silica sol (g) | $SiO_2$ (wt %) calculated after evaporation | Visc, (seconds) Ford Cup 5 |
|---|---|---|---|---|---|---|
| 1 | PEG 400 | 500 | CC30, 80 C. | 500 | 21 | 210 |
| 2 | PEG 400 | 1000 | CC30, 80 C. | 500 | 12-13 | Very viscous but pourable |
| 3 | PEG 400 | 700 | CC30, pH 2, 80 C. | 350 | 12-13 | 43 |
| 4 | PEG 400 | 700 | CC30, 40 C. | 350 | 12-13 | 131 |
| 5 | PEG 400 | 700 | 30/360 | 350 | 13 (gelled before evaporation) | Gel |
| 6 | PEG 400 | 700 | 30/360, pH 2, 80 C. | 350 | 13 | Gel |
| 7 | PEG 400 | 700 | CC30, pH 2, 80 C. | 350 | 12-13 | 55 |
| 8 | Glycerine | 712 | CC30, pH 2, 80 C. | 356 | 12-13 | 66 |
| 9 | Glycerine | 700 | CC30, 80 C. | 350 | 12-13 | 73 |
| 10 | Glycerine | 650 | CC30, 80 C. | 650 | 22 | 103 |
| 11 | Glycerine | 400 | CC30, 80 C. | 650 | 31 | 201 |
| 12 | Glycerine | 200 | CC30, 80 C. | 650 | 46 | 1200 |
| 13 | Glycerine | 400 | 30/360, pH 2, 80 C. | 650 | 32 | 235 |
| 14 | Glycerine | 200 | 30/360, pH 2, 80 C. | 650 | 48 | Gel |
| 15 | Glycerine | 200 | 30/360, pH 7, 80 C. | 650 | 45 | Gel |
| 16 | Glycerine | 400 | 30/360, pH 7, 80 C. | 650 | 32 | 557 |
| 17 | Glycerine | 400 | 820DI, 80 C. | 975 | 32 | 433 |
| 18 | Glycerine | 200 | 820DI, 80 C. | 975 | 47 | Gel |
| 19 | PEG 400 | 500 | CC30, 40 C. | 500 | 21 | 24 |
| 20 | PEG 200 | 400 | CC30, pH 2, 40 C. | 650 | 28 | 12 |
| 21 | PEG 200 | 200 | CC30, pH 2, 40 C. | 650 | 43 | 31 |
| 22 | PEG 200 | 200 | CC30, 40 C. | 650 | 44 | 41 |
| 23 | Arcoll 1108 | 400 | CC30, pH 2, 40 C. | 650 | 28 | 126 |
| 24 | PEG 200 | 200 | CC30, pH 2, 40 C. | 1300 | 53 | 1926 |
| 25 | PEG 200 | 400 | CC30, pH 2, 40 C. | 1300 | 45 | 59 |
| 26 | PEG 200 | 400 | CC30, pH 2, 60 C. | 1300 | 46 | 164 |

TABLE 3-continued

| No | Solvent | Solvent (g) | Silica sol | Silica sol (g) | $SiO_2$ (wt %) calculated after evaporation | Visc, (seconds) Ford Cup 5 |
|---|---|---|---|---|---|---|
| 27 | PEG 200 | 400 | CC30, pH 2, 80 C. | 1300 | 49* | 365 |
| 28 | PEG200 (100 g) + B (300 g) | | CC30, pH 2, 60 C. | 1300 | 37 | 22 |
| 29 | Desmophen PU 21AP27 | 400 | CC30, pH 2, 60 C. | 650 | | 17 |
| 30 | Desmophen PU 21AP27 | 600 | CC30, pH 2, 80 C. | 650 | | 448 |
| 31 | Desmophen PU 21AP27 | 400** | CC30, pH 2, 80 C. | 650 | | 358 |
| 32 | Glycerine | 800 | CC30, pH 2, 80 C. | 1300 | | 245 |
| 33 | Diethylene glycol | 800 | CC30, pH 2, 80 C. | 1300 | | 428 mPas |
| 34 | Ethylene glycol | 800 | CC30, pH 2, 80 C. | 1300 | | 61 mPas |
| 35 | Ethylene glycol | 400 | CC30, pH 2, 80 C. | 1300 | | 181 mPas |
| 36 | Dowanol TPM | 800 | CC30, pH 2, 50 C. | 1300 | | White emulsion 35 s/ 1200 mPas |
| 37 | Dowanol DPM | 800 | CC30, pH 2, 50 C. | 1300 | | White emulsion that will be clear solution upon addition of water Viscosity: 25 s |
| 38 | Dowanol PM | 800 | CC30, pH 2, 50 C. | 1300 | | 8 s/31 mPas |
| 39 | Dipropylene glycol | 400 | CC30, pH 2, 50 C. | 650 | | 27 s/503 mPas |
| 40 | Dipropylene glycol | 400 | 30/360 | 650 | | Gel after 200 g added |
| 41 | Dowanol TPM | 400 | 30/360 | 650 | | Gel after 200 g added |
| 42 | Dowanol DPM | 400 | 30/360 | 650 | | Gel after 200 g added |
| 43 | Dowanol PM | 400 | 30/360 | 650 | | Gel after 200 g added |
| 44 | Dipropylene glycol | 400 | 820DI, 50 C. | 975 | | 101 s/>2000 mPas |
| 45 | PEG200 | 800 | Bindzil CC301 | 1300 | | 300 mPas |
| 46 | Ethylene glycol | 400 | Bindzil CC301 | 1300 | | 790 mPas |

CC30: 29% SiO2
30/360: 30% SiO2
*Some silica went over into the condensate Arcoll 1108 only partly water miscible
B: Desmophen PU 21AP27
**Addition of 20 g ethanol to the polyol before mixing with silica sols TABLE 4a

| No | $SiO_2$ wt-% by XRF | $H_2O$ wt-% (Karl Fisher) | Visc. Ford Cup 5 |
|---|---|---|---|
| 25 | 41.2 | 5.0% | 92 s (8 weeks old sample) |
| 26 | 43.8 | 2.0% | 228 s (3 weeks old sample) |
| 26a | 41.2 | 5.0% | 78 s |
| 27 | 44.1 | 0.93% | 453 s (3 weeks old sample) |
| 27a | 41.2 | 5.0% | 86 s | aDiluted sample with DI-water and PEG 200 in order to have the same water and silica content as No 25.

TABLE 4b

| No | $SiO_2$ wt-% by XRF | $H_2O$-wt % (Karl Fisher) |
|---|---|---|
| 28 | 34.8 | 28.0% |
| 29 | 22.1 | 30.0% |
| 30 | 25.5 | 8.4% |
| 31 | 23.1 | 3.2% |
| 32 | 29.5 | 1.2% |
| 33 | 28.4 | 1.1% |
| 34 | 28.8 | 1.3% |
| 35 | 42.6 | 1.6% |

TABLE 5

| No | Sample preparation date | Visc. (sec.) Ford Cup 5 (aged) measured on 2008-12-22 if not otherwise indicated |
|---|---|---|
| 1 | 2008-04-11 | 912 |
| 2 | 2008-04-11 | 10 |
| 3 | 2008-04-11 | 100 |
| 4 | 2008-04-11 | gel |
| 7 | 2008-04-16 | very viscous but pourable |
| 8 | 2008-04-16 | 93 |
| 9 | 2008-04-16 | 95 |
| 10 | 2008-04-16 | 150 |
| 11 | 2008-04-17 | 282 |
| 12 | 2008-04-17 | 2556 |
| 13 | 2008-04-17 | 459 |
| 16 | 2008-04-17 | Gel |
| 17 | 2008-04-18 | 885 |
| 19 | 2008-04-21 | 15 |
| 20 | 2008-05-16 | 12 |
| 21 | 2008-05-16 | 31 |
| 22 | 2008-05-16 | 41 |
| 23 | 2008-08-14 | 126 |
| 24 | 2008-08-15 | 3208 |
| 25 | 2008-08-15 | 59 |
| 26 | 2008-09-23 | 241 |
| 27 | 2008-09-23 | 428 |
| 28 | 2008-11-18 | 19 |
| 29 | 2008-11-18 | 16 |
| 30 | 2008-11-20 | 418 |
| 31 | 2008-11-20 | very viscous but pourable |
| 32 | Visc. After 78 days | 242 s |
| 33 | Visc. After 25 days | 150 mPas |

As can be seen in Table 5, the storage stability of the dispersions according to the invention is excellent, whereas the comparative dispersions 5-6 and 13-18 (comprising non-silanised silica particles) either become unstable and gel, or become much more viscous than dispersions based on silanised silica particles prepared under comparable conditions, i.e. with equal or similar amounts of silica, polyol, mixing temperature etc.

Heat Stability

In order to evaluate temperature stability and to have an indication whether the silica is freely dispersed in the polyol or react with the polyol as well as being stable enough in the polyol to be used under temperatures relevant for resins, e.g. alkyd polymerization. About 50 g (volume about 30 ml) of silica sol No 13 and No 33 were autoclaved in a 50 ml autoclave at 220° C. for 5 hours.

After autoclaving:

Non-silanised silica sol No 13 was fully polymerized into a hard solid material.

Silanised silica sol No 33 on the other hand had low viscosity at high temperature and liquid (though viscous) at room temperature.

The invention claimed is:

1. A stable dispersion comprising silanised colloidal silica particles having a weight ratio of silane to silica ranging from about 0.1 to about 1.5, and at least one organic compound containing at least two hydroxyl groups, wherein the silanised colloidal silcia particles is substantially unmodified with respect to monofunctional alcohol such that less than about 10 wt % of the silanised colloidal silica particles are modified by a monofunctional alcohol, wherein the dispersion is substantially free of any monofunctional alcohol, wherein the water content in the dispersion is below about 10 wt %, wherein a viscosity of the dispersion is increased less than 2 times over a period of 2 months, and further wherein the dispersion does not appear in an inhomogeneous form.

2. The dispersion according to claim 1, wherein the water content in the dispersion is below 5 wt %.

3. The dispersion according to claim 1, wherein said at least one organic compound is a polyol.

4. The dispersion according to claim 1, wherein the weight ratio of silica to organic compound ranges from about 1:20 to about 4:1.

5. The dispersion according to claim 3, wherein said polyol has a molecular weight of from about 62 to about 200 g/mole.

6. A method of performing condensation polymerization wherein said polymerization is performed in the presence of the dispersion according to claim 1.

7. A lacquer or coating composition comprising the dispersion according to claim 1.

8. A method of producing a polymeric material comprising reacting
   a) the dispersion according to claim 1; and
   b) at least one component selected from an isocyanate, a dicarboxylic acid, an epoxide, a siloxane or a diamine.

9. A method according to claim 8, in which the polymeric material is polyurethane, polyester, epoxy resins, polysiloxane, or a polyamide.

10. The dispersion according to claim 1, wherein the inhomogeneous form is a precipitated form.

11. A stable dispersion comprising (A) silanised colloidal silica particles and (B) at least one organic compound containing at least two hydroxyl groups, said silanised colloidal silica particles being substantially unmodified with respect to monofunctional alcohol, said silanized colloidal silica particles having a weight ratio of silane to silica ranging from about 0.2 to about 1.5, said at least one organic compound having a molecular weight ranging from about 62 to about 200 g/mol, said dispersion being substantially free of any monofunctional alcohol such that less than about 10 wt % of the silica particles are modified by a monofunctional alcohol, said dispersion having a water content below about 10 wt %, wherein the dispersion exhibits a viscosity increase of less than 2 times over a period of 2 months and does not appear in an inhomogeneous form.

12. The dispersion according to claim 11, wherein the inhomogeneous form is a precipitated form.

13. A method of producing a stable dispersion comprising
   a) mixing an aqueous dispersion of silanised colloidal silica particles having a weight ratio of silane to silica ranging from about 0.1 to about 1.5 with at least one organic compound containing at least two hydroxyl groups to provide an aqueous dispersion of silanised colloidal silica particles and said at least one organic compound, said silanised colliodal silcia particles being substantially unmodified with respect to mono functional alcohol such that less than about 10 wt % of the silica particles are modified by a monofunctional alcohol, wherein the mixing is performed in the substantial absence of any monofunctional alcohol
   b) withdrawing water from the formed aqueous dispersion until the remainder of water in the dispersion is below about 10 wt %, wherein the produced stable dispersion comprising silanised colloidal silica having a weight ratio of silane to silica from about 0.1 to about 1.5 and at least one organic compound containing at least two hydroxyl groups, wherein the silanised colloidal silica particles are substantially unmodified with respect to monofunctional alcohol such that less than about 10% by weight of the silansied colloidal silica particles are modified by monofunctional alcohol, the stable dispersion is substantially free of any monofunctional alcohol, the water content in the stable dispersion is below about 10 wt %, a viscosity of the stable dispersion is increased less than 2 times over a period of 2 months, and further the stable dispersion does not appear in an inhomogeneous form.

14. A method according to claim 13, wherein said at least one organic compound is a polyol.

15. A method according to claim 14, wherein the polyol has a molecular weight of from about 62 to about 200 g/mole.

16. A method according to claim 14, wherein the weight ratio of silica to organic compound ranges from about 1:20 to about 4:1.

* * * * *